Dec. 31, 1940.  W. A. ANDERSON  2,226,960
ACCOUNTING MACHINE
Filed Dec. 31, 1937  8 Sheets-Sheet 1

INVENTOR
WALTER A. ANDERSON
BY
ATTORNEY

Dec. 31, 1940.   W. A. ANDERSON   2,226,960
ACCOUNTING MACHINE
Filed Dec. 31, 1937   8 Sheets-Sheet 2

INVENTOR
WALTER A. ANDERSON
BY
*L. G. Julihn*
ATTORNEY

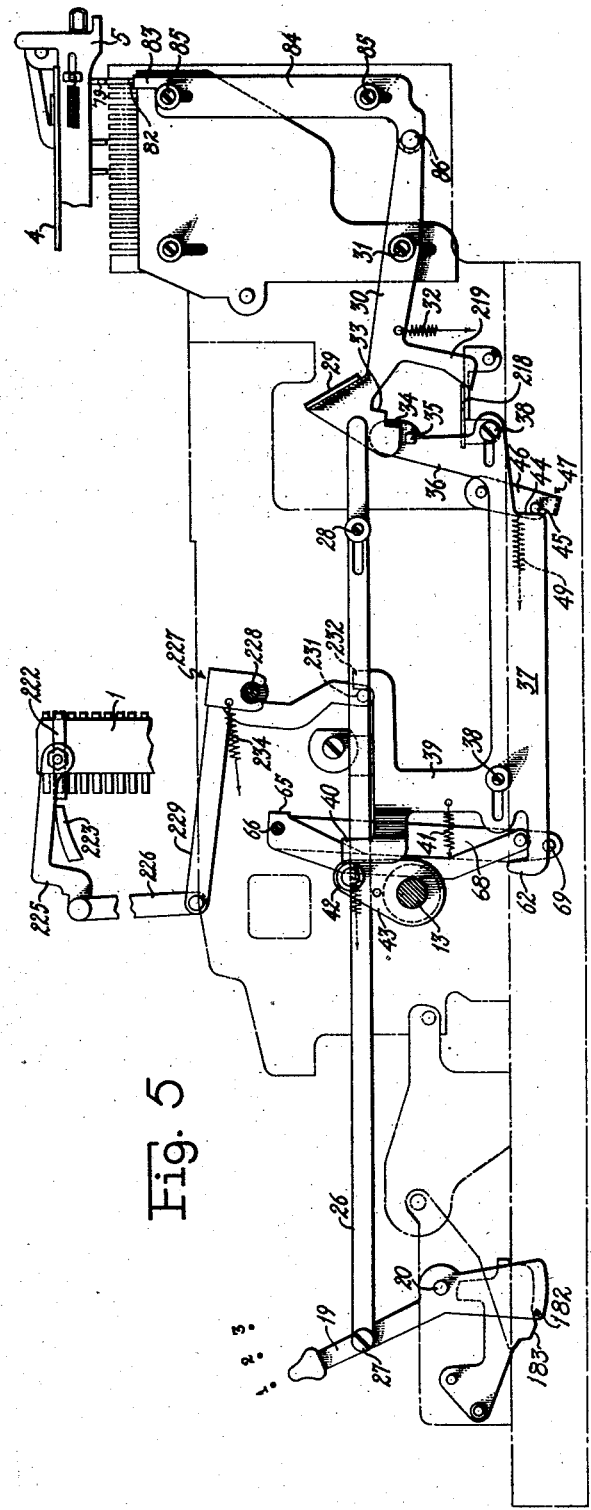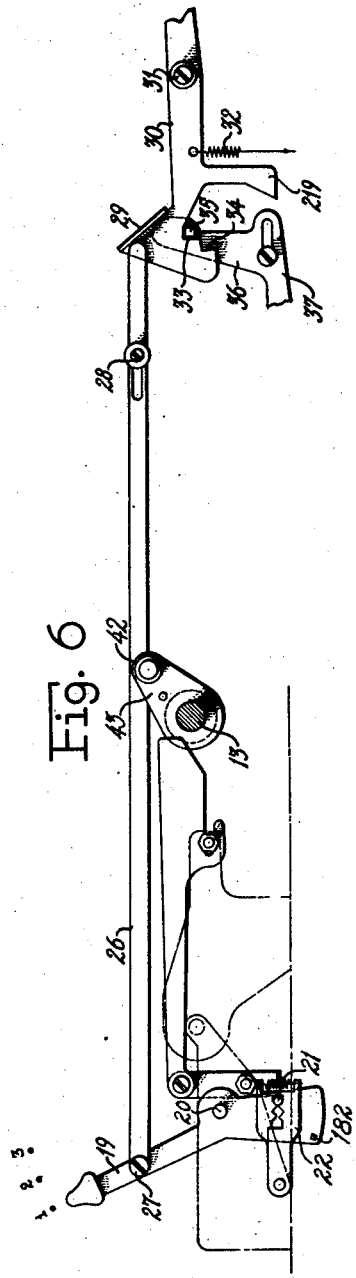

Dec. 31, 1940. W. A. ANDERSON 2,226,960
ACCOUNTING MACHINE
Filed Dec. 31, 1937 8 Sheets-Sheet 4

INVENTOR
WALTER A. ANDERSON
BY
*L. G. Julihn*
ATTORNEY

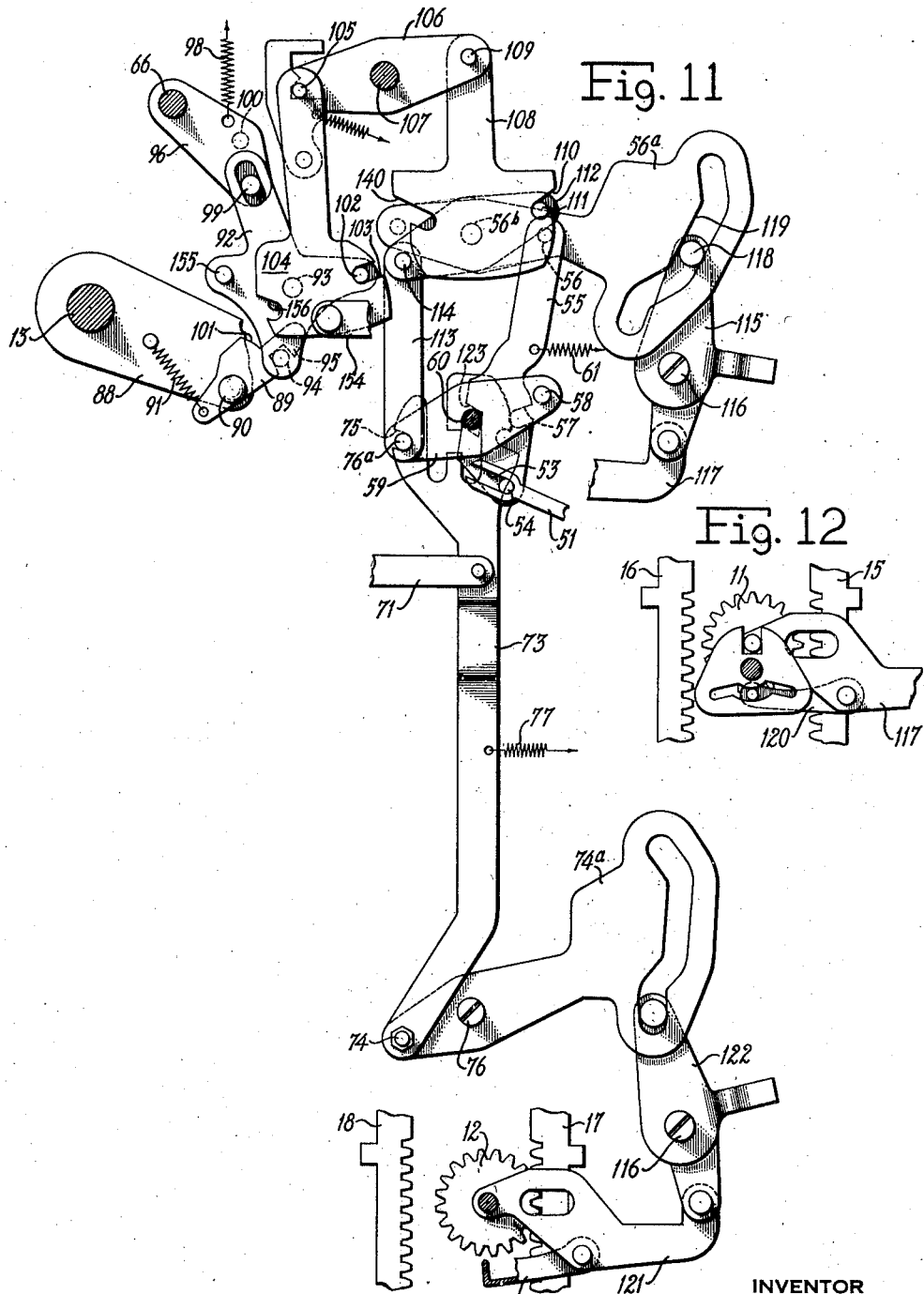

Dec. 31, 1940.　　W. A. ANDERSON　　2,226,960
ACCOUNTING MACHINE
Filed Dec. 31, 1937　　8 Sheets-Sheet 7
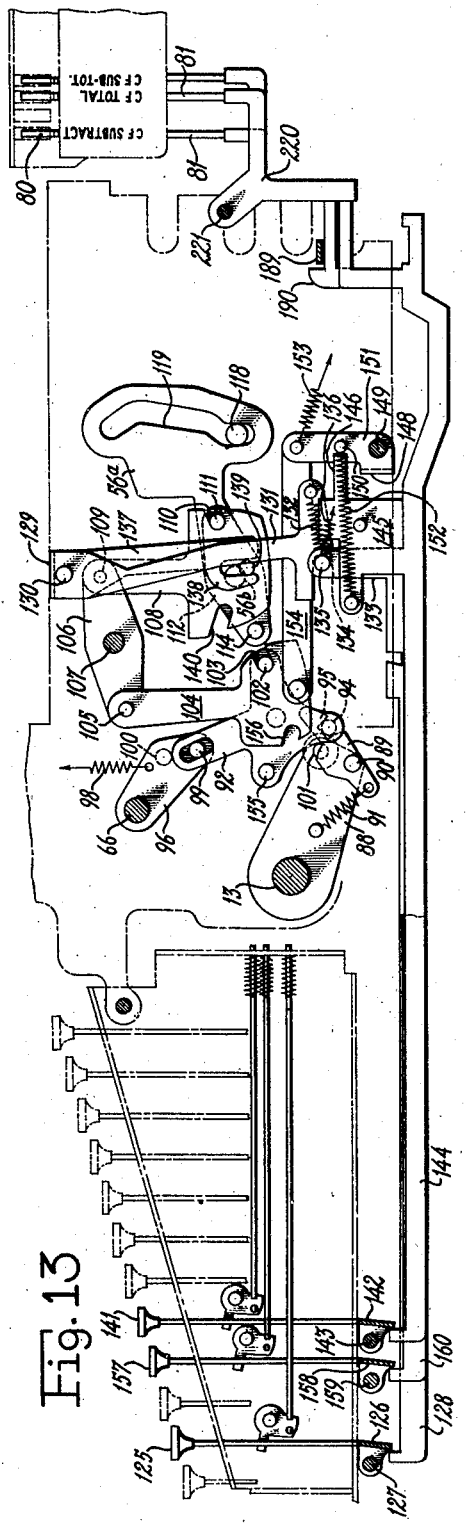
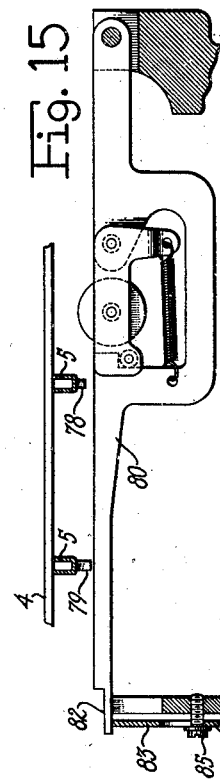
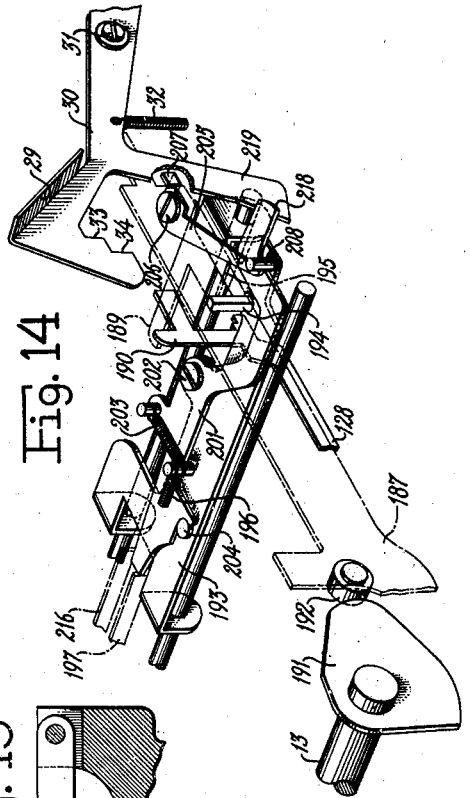
INVENTOR
WALTER A. ANDERSON
BY
ATTORNEY Dec. 31, 1940.   W. A. ANDERSON   2,226,960
ACCOUNTING MACHINE
Filed Dec. 31, 1937   8 Sheets-Sheet 8
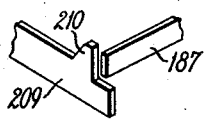
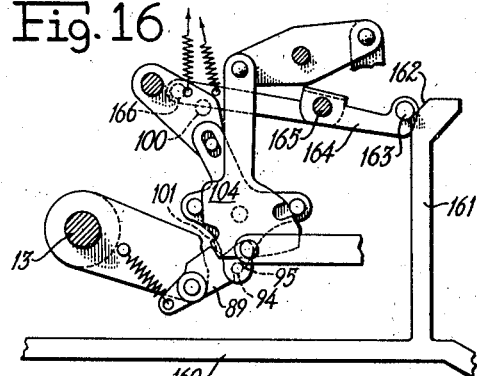
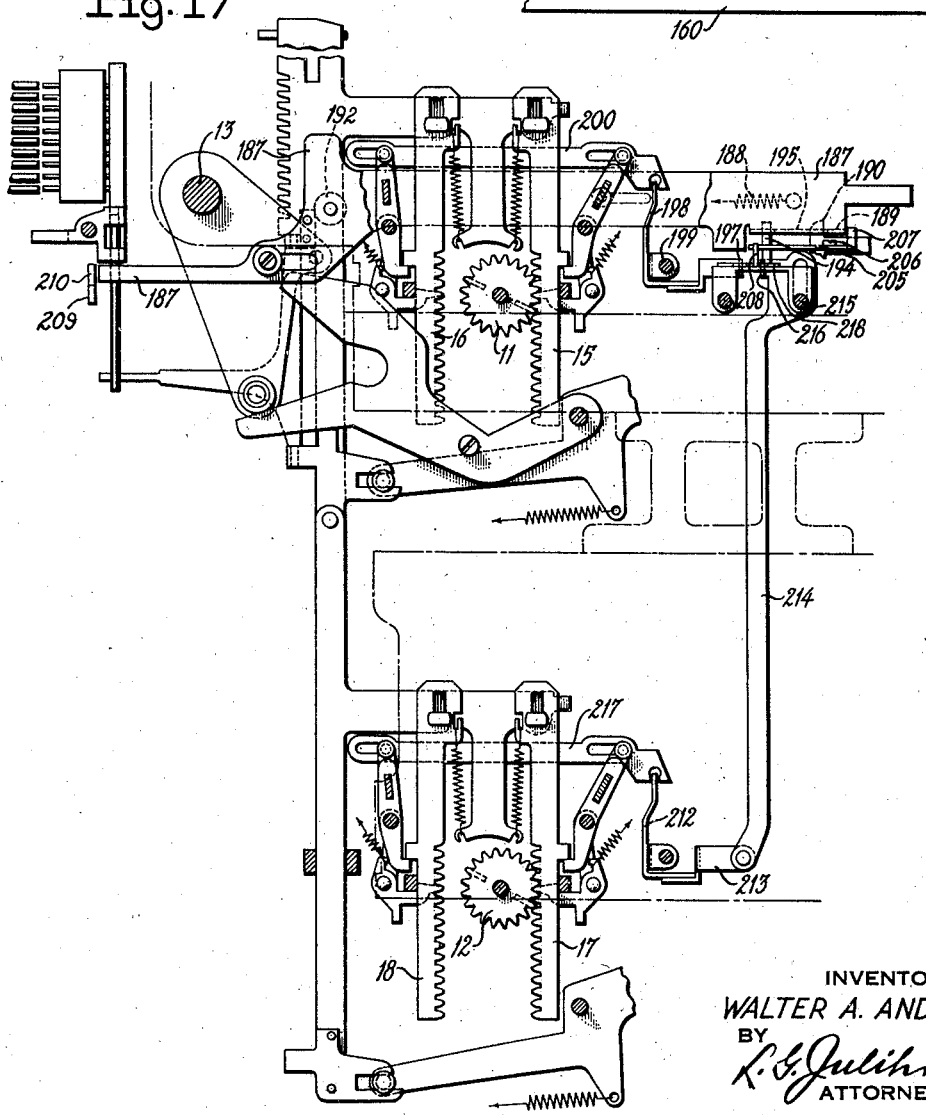
INVENTOR
WALTER A. ANDERSON
BY
ATTORNEY Patented Dec. 31, 1940

2,226,960

UNITED STATES PATENT OFFICE 2,226,960

ACCOUNTING MACHINE

Walter A. Anderson, Bridgeport, Conn., assignor to Underwood Elliott Fisher Company, New York, N. Y., a corporation of Delaware Application December 31, 1937, Serial No. 182,682

2 Claims. (Cl. 235—60)

This invention relates to accounting machines of the key set motor operated type, and more particularly to the selective controls for the crossfooters thereof.

The primary object of the present invention is to provide a machine having a plurality of crossfooters with an automatic crossfooter selecting mechanism capable of selecting the crossfooters either jointly or independently, and which in no way interferes with the manual selection thereof.

Another object of the invention is to provide an automatic crossfooter selecting mechanism which is controlled by the paper carriage in a manner which allows free and easy movement of the carriage in its travel from column to column.

A further object of the invention is to provide a crossfooter control mechanism which is simple in design and construction.

With these and incidental objects in view, the invention consists in certain novel features of construction and combinations of parts, the essential elements of which are set forth in appended claims, and a preferred embodiment of which is hereinafter described with reference to the drawings which accompany and form part of the specification.

Figure 3:
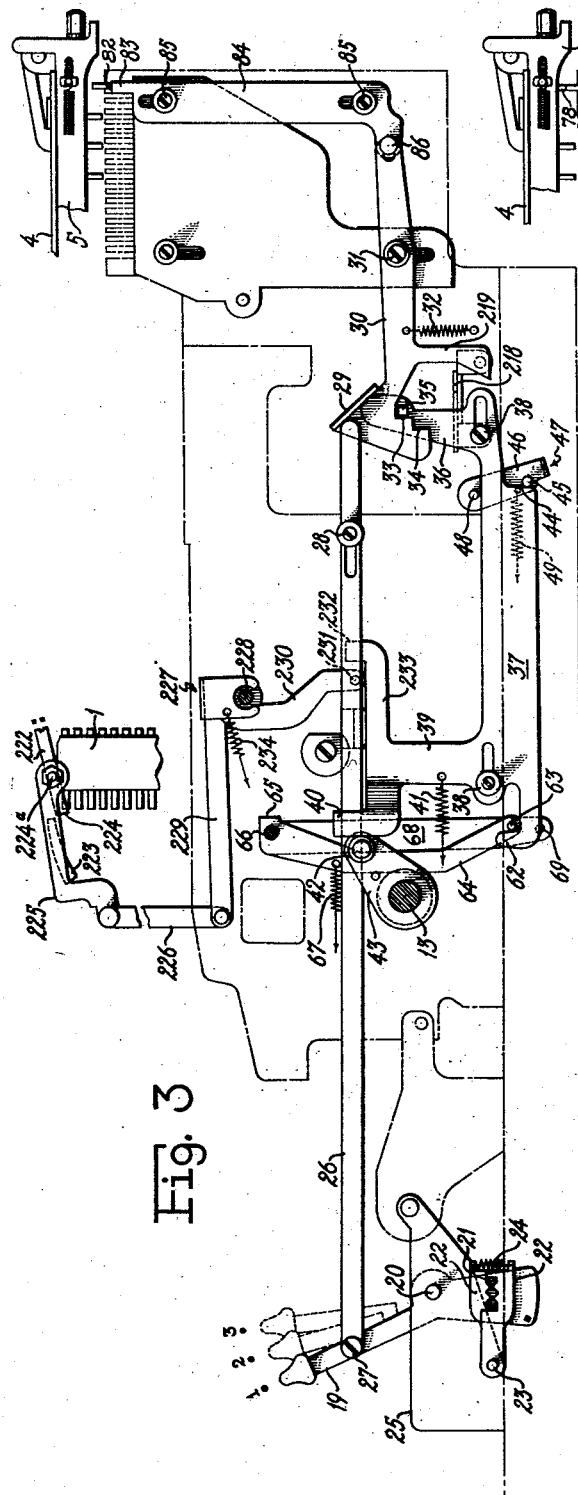
Figure 4:
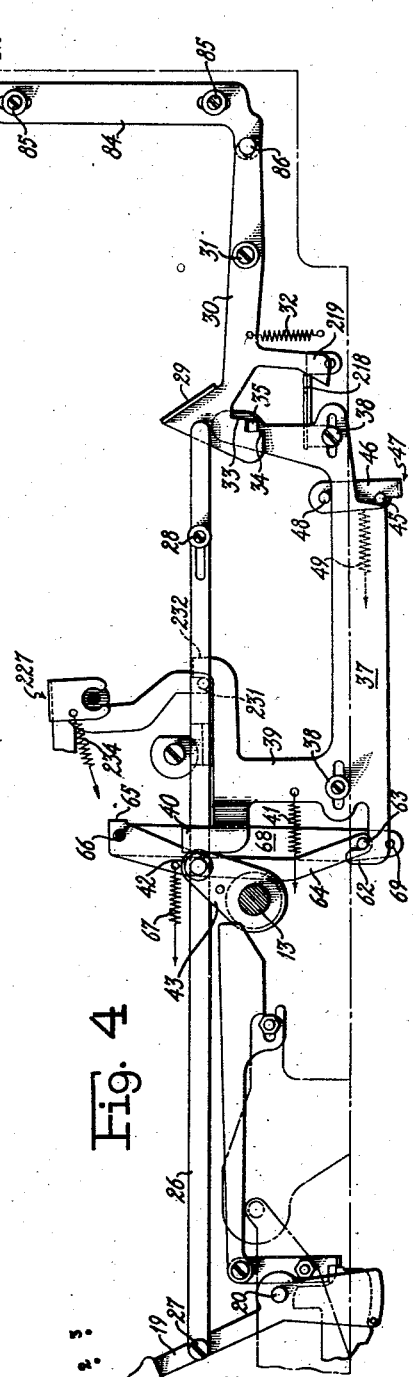
Figure 7:
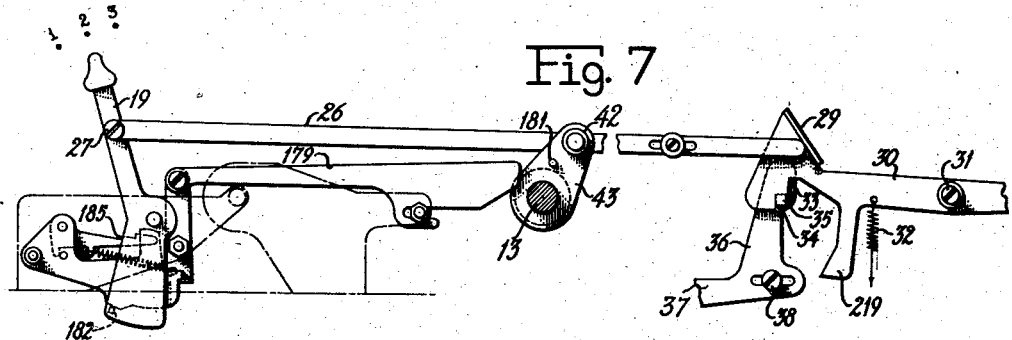
Figure 8:
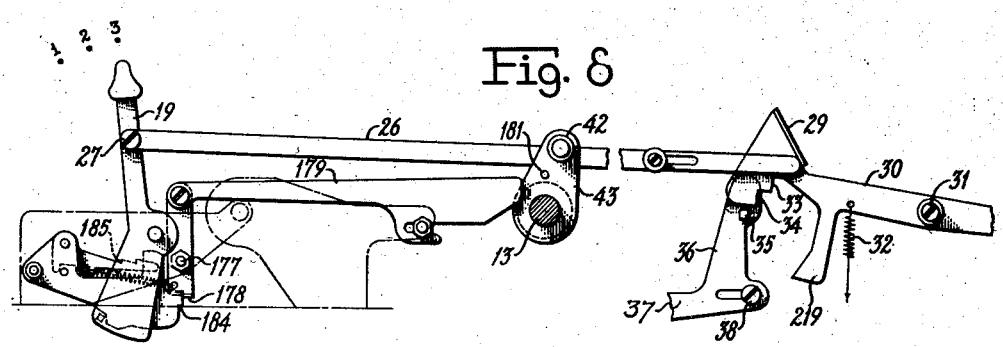
Figure 9:
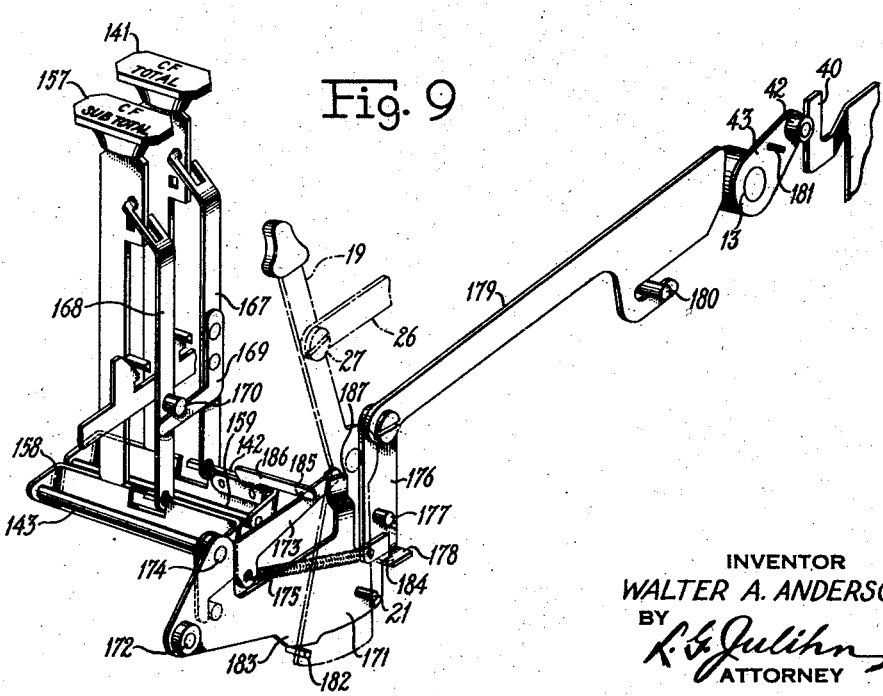
Figure 10:
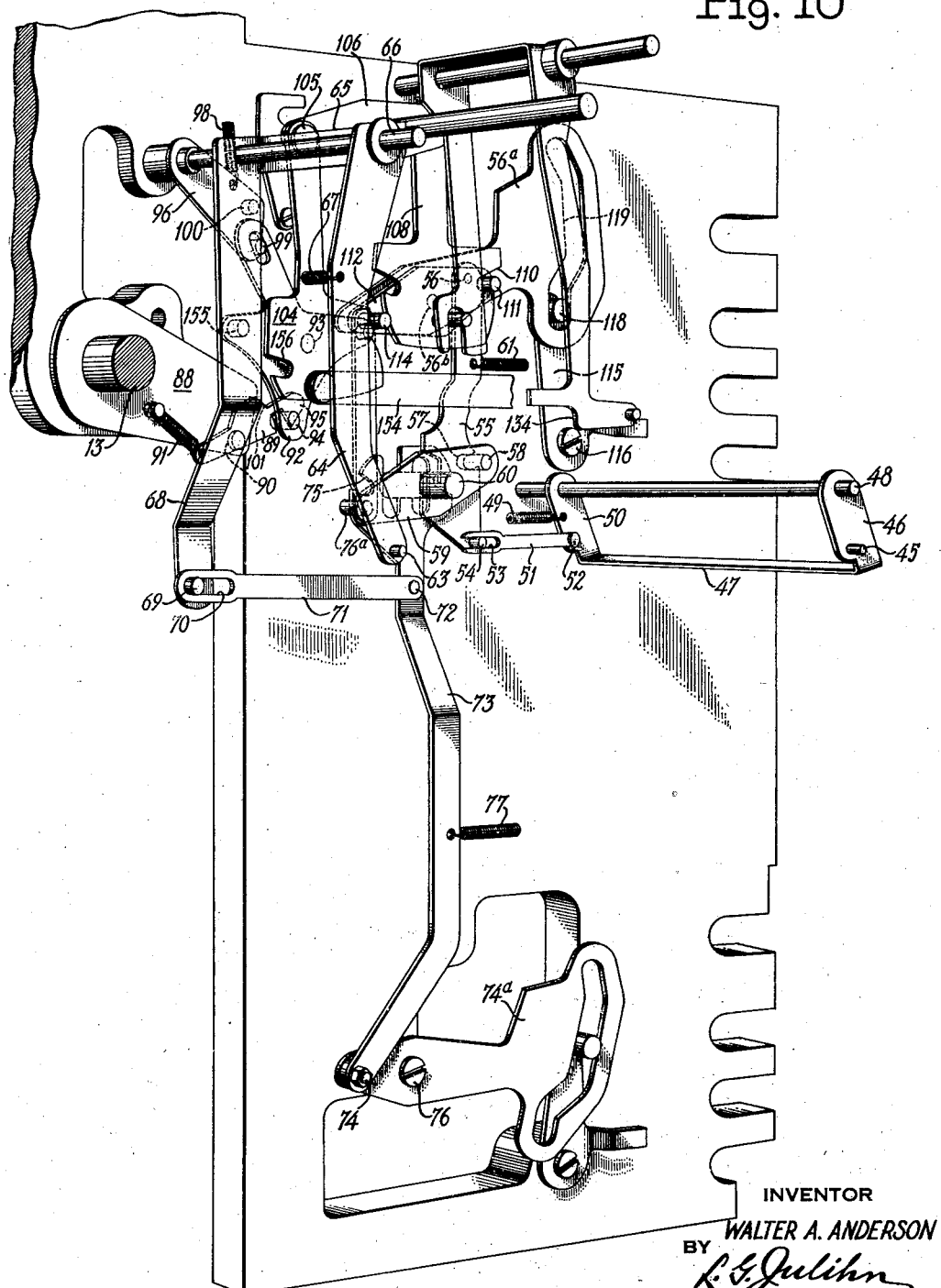

Figure 3 is a right side elevation showing the automatically controlled crossfooter selecting mechanism with the parts in position for selecting the upper crossfooter alone, Figure 4 is a view similar to Figure 3 but with the parts shown in the position for selecting the upper and lower crossfooters jointly, Figure 5 is a view similar to Figures 3 and 4 but with the parts shown in the position for selecting the lower crossfooter alone, Figure 6 is a right side elevation of the manually controlled crossfooter selecting mechanism in position for selecting the upper crossfooter alone, Figure 7 is a view similar to Figure 6 but with the parts shown in position to select the upper and lower crossfooter jointly, Figure 8 is a view similar to Figures 6 and 7 but with parts shown in position to select the lower crossfooter alone, Figure 9 is a perspective view showing the parts used for locking the crossfooter total and sub-total keys against depression when the crossfooters are manually selected for joint operation, Figure 10 is a perspective view of certain of the parts shown in Figures 3, 4 and 5 and showing the connections between these parts and the crossfooter engaging mechanism, Figure 11 is a right side elevation of the parts shown in Figure 10, and their connection to the crossfooters, Figure 12 is a detail right side elevation of the upper crossfooter and parts of its engaging mechanism, Figure 13 is a right side elevation of certain of the parts shown in Figures 10 and 11, and shows the connections of the automatic total and subtract controls, Figure 14 is a detail perspective view showing the parts provided for automatically conditioning the machine for the taking of positive or negative totals from the crossfooters, Figure 15 is a detail rear view of parts of the carriage control mechanism, Figure 16 is a right side elevation of parts of the crossfooter sub-total mechanism, Figure 17 is a right side elevation showing the actuating mechanism and certain of the parts used in conditioning the machine for the taking of positive and negative totals, and Figure 18 is a detail perspective view of parts of a lock between the amount keyboard and the conditioning mechanism for controlling the taking of positive and negative totals.

GENERAL DESCRIPTION

This machine is an improvement on the pending applications of Oscar J. Sundstrand, Serial No. 581,800, filed December 18, 1931, and Serial No. 88,092, filed June 30, 1936. The machine includes the customary keyboard with amount keys, date keys and totalizer and printer controlling keys. It has the customary traveling paper carriage that is automatically tabulated from column to column, and which is automatically returned from a predetermined point in the carriage travel. The carriage includes a control plate carrying a series of magazines with control lugs for automatically controlling the numerous operations that are controlled manually by the keyboard. The machine includes eight registers and two crossfooters, four registers and one crossfooter being located in an upper group and the other four registers and crossfooter being located in a lower group. All of the registers and crossfooters are actuated by a common set of actuators adjustable under control of pins set by the amount keys. The actuators also control the adjustment of type for printing amounts and totals. Each group of four adding registers has separate transfer elements, and the crossfooters likewise have separate sets of transfer elements, the crossfooters also having independent overdraft mechanism for printing negative balances. Selection of the adding registers is performed by depression of one of four keys to select a particular register in the upper or lower group, and the group in which the desired register is located is selected by the depression of a "second group key." Totals are taken from the adding registers by depressing the proper register selecting keys, operating the machine through a blank cycle, then depressing the register total key and again operating the machine. Subtotals are taken from the adding register in the same manner as totals except that the register non-add key is depressed jointly with the register total key.

The crossfooters are selected manually by a separate lever operating independently from the selecting means for the adding registers. In its normal forward position this lever selects the upper crossfooter. When moved one step to its intermediate position it selects both crossfooters, and when moved another step to its rear position it selects the lower crossfooter. The crossfooters are automatically selected under the control of lugs in magazines mounted on the carriage control plate. When there is no lug in the crossfooter selecting position of a magazine, the upper crossfooter is selected. A short lug in this position of the magazine selects both upper and lower crossfooters, while a full length lug selects the lower crossfooter alone.

Crossfooter totals or sub-totals may be taken either automatically or manually from either the lower or upper crossfooters.

To take crossfooter totals manually, the shift lever is moved to either its forward or rear position to select the desired crossfooter, and a blank cycle taken. The crossfooter total or sub-total key is then depressed and the machine again operated.

To take crossfooter totals automatically, the desired crossfooter is selected as explained above. The machine is then given a blank cycle of operation, and the carriage advances to the next columnar position where total or sub-total lugs control the machine to take the total out of the selected crossfooter.

Signal mechanism similar to that disclosed in the above referred to application Serial No. 88,092 is provided to print a special indicating symbol for totals taken from the lower crossfooter.

DETAILED DESCRIPTION

The description is divided into the following topics:
1. The machine sections and general actuating mechanism.
2. Crossfooters—in general.
3. Manual selection of the crossfooters in general.
4. Manual selection of the upper crossfooter.
5. Manual selection of upper and lower crossfooters jointly.
6. Manual selection of lower crossfooter.
7. Automatic selection of crossfooters in general.
8. Automatic selection of upper crossfooter.
9. Automatic selection of upper and lower crossfooters jointly.
10. Automatic selection of lower crossfooter.
11. Engagement of upper crossfooter.
12. Engagement of upper and lower crossfooters for joint actuation.
13. Engagement of lower crossfooter alone.
14. Actuation of the crossfooters.
15. Subtraction in the crossfooters.
16. Taking totals from crossfooters.
17. Taking sub-totals from the crossfooters.
18. Locks to prevent depression of crossfooter total keys at improper times.
19. Taking an overdraft total from the upper crossfooter.
20. Taking an overdraft total from the lower crossfooter.
21. Automatic control of crossfooter subtract, total and sub-total operations.
22. Signal printing for totals taken from the lower crossfooter.

1. *The machine sections and general actuating mechanism*

Figure 1:
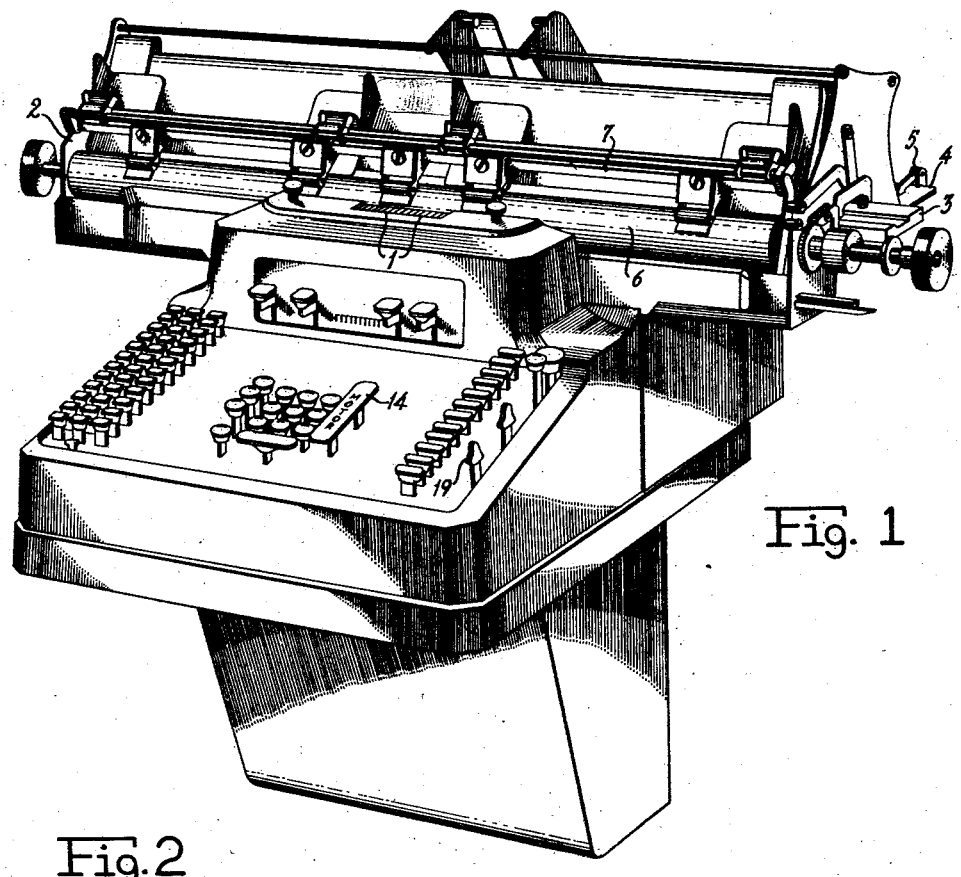
Figure 1 is a perspective of the entire machine.

Referring to Figure 1, the machine includes a keyboard, type bars 1 for printing on the inserted paper, a laterally movable paper carriage indicated generally at 2, mounted on a track 3, and a control plate 4 mounted on the traveling paper carriage and having a plurality of control magazines 5 for controlling the various operations in predetermined columnar positions. The carriage is provided with the customary roller platen 6 for the insertion of the paper at the rear thereof, and a bail structure 7 for use in feeding paper sheets in front of the platen. The machine also includes eight adding registers (not shown) arranged in two groups situated one above the other, there being four registers in each group. The selection, engagement and actuation of these registers is fully shown and described in the before-mentioned application Serial No. 88,092. Each of these registers includes a plurality of ten tooth wheels, and each is operable for adding only. Situated in front of these registers are two crossfooters, each having a plurality of twenty tooth wheels 11 and 12 (Figure 17). The crossfooters are arranged for both addition and subtraction.

Figure 2:
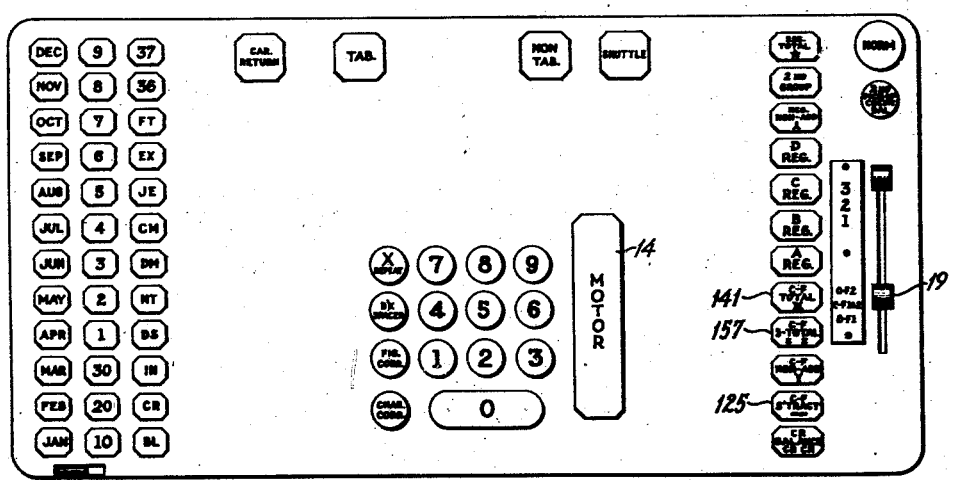
Figure 2 is a diagrammatic view of the keyboard.

The conditioning of the machine for adding, subtracting, non-adding, total taking, sub-total taking, computing selectively in the various registers and crossfooters, etc., is controlled manually by the keys and levers situated at the right hand side of the keyboard (Figures 1 and 2).

The machine is actuated by an electric motor (not shown). The motor is started by the closing of suitable switch mechanism and is coupled to an actuating shaft 13 (Figure 3) by a suitable clutch mechanism upon depression of a motor bar 14 (Figure 1). The actuating shaft is connected with the motor drive in such a manner that it is rocked, first, counterclockwise (Figure 3), and then clockwise, about ninety degrees during each operation of the machine.

2. *Crossfooters—in general*

The two adding and subtracting crossfooters are each composed of a number of twenty tooth wheels 11 and 12 (Figures 11, 12 and 17) engageable with actuating racks 15 and 16 for adding and subtracting respectively in the upper crossfooter, and with racks 17 and 18 for adding and subtracting respectively in the lower crossfooter. The two crossfooters are each provided with a set of the usual transfer elements (not shown). These crossfooters, together with their transfer and actuating elements, are identical with those disclosed in application Serial No. 581,800, and therefore, will not be described in detail.

3. Manual selection of the crossfooters in general

The crossfooters are selectively controlled manually for engagement with their actuating racks by a lever 19 (Figure 3). This lever is pivoted on a stud 20 and has a stud 21 on its lower arm. The lever 19 is movable to any of three positions, as illustrated in Figures 6, 7 and 8. A pair of identical detent arms 22 (Figure 3) are pivoted on a common stud 23 and each has three opposing notches adapted to embrace stud 21. A strong spring 24 holds the latch arms together to retain lever 19 in any moved position. The studs 20 and 23 are mounted on a plate 25 secured to the machine frame. When the lever 19 is in the position shown in Figures 3 and 6, the upper crossfooter is selected and engaged for actuation. When the lever is in its intermediate position, as shown in Figure 7, both crossfooters are selected for engagement, and when the lever is in the position shown in Figure 8, the lower crossfooter is selected for engagement.

4. Manual selection of the upper crossfooter

Referring to Figure 6, a slide 26 is pivoted on a stud 27 on the upper arm of lever 19 and is slidably mounted at its rear end on a stud 28 in the machine frame. The rear end of slide 26 is rounded and underlies a flange 29 formed on a crossfooter selection blank 30. Blank 30 is pivoted intermediate its ends on a stud 31 in the machine frame and is tensioned counter-clockwise by a spring 32 fastened to the forward end of the blank and to the machine frame (Figure 3). This counter-clockwise tension is restricted by flange 29 of blank 30 contacting slide 26. Blank 30 is provided at its forward end with two notches 33 and 34 below flange 29. The notches 33 and 34 are arranged to engage a square stud 35 projecting from an upstanding arm 36 on the rear of a crossfooter control slide 37. Slide 37 (Figure 3) is mounted upon studs 38 passing through slots in the forward and rear ends thereof and secured in the machine frame. An upstanding arm 39 on the forward end of the slide has a projection 40. A spring 41, secured between the forward end of slide 37 and the machine frame, tensions slide 37 and projection 40 forwardly against a roller 42 carried by an arm 43 secured to actuating shaft 13. The arm 43 in its normal position (when machine is at rest), shown in Figure 3, holds slide 37 sufficiently rearward against the tension of spring 41 to provide clearance between stud 35 and notch 33 to permit adjustment of the latter without hindrance from these parts. As previously stated, when the machine is cycled, actuating shaft 13 is rocked first counter-clockwise about ninety degrees, and then clockwise back to normal position. When lever 19 is in its No. 1 position, slide 26 retains blank 30 in a position where notch 33 lies in the path of forward movement of stud 35 of the crossfooter control slide 37.

A shoulder 44 on slide 37 contacts (when the machine is at rest) a stud 45 in an arm 46 of an upper crossfooter control bail 47 pivoted on an axis 48. A strong spring 49 is secured to the other arm 50 of bail 47 (Figure 10) and to the machine frame, tensioning the bail clockwise about its axis 48 and maintaining stud 45 against shoulder 44. A link 51 (Figures 10 and 11) is pivoted on a stud 52 on arm 50 and has a slot 53 embracing a stud 54 on the lower end of an engaging link 55 for the upper crossfooter. Link 55 is pivoted at its upper end on a stud 56 to an upper crossfooter cam lever 56ᵃ pivoted on a rod 56ᵇ and arranged to control engagement of the upper crossfooter, as described in a subsequent section herein. A notch 57 in the lower end of link 55 is adapted to embrace a stud 58 on a rocker 59 pivoted on a stationary rod 60. A weak spring 61 connected between link 55 and the machine frame tensions the link counter-clockwise about its pivot 56 and maintains notch 57 in engagement with stud 58. It will be noted that when the machine is at rest there is a gap between stud 54 and the rear end of slot 53 and the lower forward edge of engaging link 55 is adjacent rod 60 (Figure 10). Cycling of the machine causes actuating shaft 13 (Figure 3), arm 43, and roller 42 to swing counter-clockwise on the first half of the cycle, whereupon slide 37 moves forward a slight amount, under tension of spring 41, taking up the clearance between notch 33 and stud 35. Hence, bail 47 and link 55 are retained in their substantially normal positions wherein the upper crossfooter is selected by virtue of link 55 being allowed to remain connected to stud 58 in rocker 59 during the entire operation to follow. During this operation the lower crossfooter is held idle by parts to be later described.

5. Manual selection of upper and lower crossfooters jointly

When it is desired to accumulate in both crossfooters jointly, the crossfooter selecting lever 19 is moved to its intermediate position shown in Figure 7. When it is moved from the position shown in Figure 6 to this position it moves slide 26 rearwardly, and by virtue of contact with flange 29, it cams selection blank 30 clockwise about its pivot 31 against tension of spring 32 a distance sufficient to raise lower notch 34 into the path of stud 35 on the control slide 37. Spring 24 of detent arms 22 (Figure 3) is superior to spring 32 of blank 30 and thus maintains the blank in its adjusted position.

A projection 62 on slide 37 lies in front of a stud 63 in one arm 64 of a lower crossfooter selecting bail 65 (Figures 4 and 10) pivoted on a rod 66. A strong spring 67 is secured between arm 64 and the machine frame to tension bail 65 clockwise about rod 66 and hold stud 63 against projection 62. A downwardly extending arm 68 of bail 65 carries at its lower end a stud 69 lying within a slot 70 in the forward end of a link 71 pivoted at 72 to an engaging link 73 for the lower crossfooter. This engaging link is pivoted at 74 to a lower crossfooter cam lever 74ᵃ pivoted at 76 and arranged to control engagement of the lower crossfooter, as described subsequently in another section of this specification. A notch 75 in the upper end of link 73 is adapted to engage a stud 76ᵃ on the forward end of rocker 59 although normally such engagement is prevented by clockwise tension of a weak spring 77 connected between link 73 and the machine frame.

Upon cycling the machine with lever 19 in the position above described, roller 42 moves forward and permits slide 37 to move forward under tension of spring 41 until stud 35 thereof engages notch 34 of selection blank 30. Such movement of control slide 37 in turn permits bails 47 and 65 to move forward one step under tension of springs 49 and 67 respectively. The amount of movement permitted bail 47 is just sufficient to take up the gap between rear end of slot 53 in link 51 and stud 54 in link 55. Hence, the upper crossfooter remains selected. The amount of movement permitted bail 65 is sufficient to permit superior spring 67 (Figure 10) through link 71 to pull link 73 forward against the tension of inferior spring 77, the forward edge of link 73 temporarily abutting stud 76ᵃ. Subsequent operation of rocker 59 raises stud 76ᵃ allowing spring 67 to pull notch 75 into engagement with stud 76ᵃ. This selects the lower crossfooter for engagement.

6. Manual selection of lower crossfooter

When it is desired to accumulate in the lower crossfooter to the exclusion of the upper crossfooter, the crossfooter selecting lever 19 is moved to its No. 3 position shown in Figure 8. When it is moved from the position shown in Figure 7 or Figure 6 to the position shown in Figure 8, slide 26 moves an additional step rearwardly and cams selection blank 30 an additional step clockwise about its pivot 31 against the tension of spring 32. This raises notch 34 above the path of stud 35 of the control slide 37. Cycling of the machine with lever 19 in this position allows slide 37 to move forward, under the tension of spring 41, to its extreme forward position shown in Figure 5, the movement of the slide being limited by studs 38. This movement of the slide permits bail 47 to move to its extreme forward position under tension of spring 49, and bail 65 moves forward to precisely the same position described in the immediately preceding section wherein the lower crossfooter is selected. Extreme forward movement of bail 47 moves link 51 forward a distance sufficient to take up the gap between the rear end of slot 53 and stud 54 and further to impart sufficient movement to link 55 to withdraw notch 57 from engagement with stud 58 when rocker 59 is operated during the ensuing cycle sufficiently to bring a notch 123 (Figure 11) into alignment with rod 60, spring 49 swinging link 55 forwardly at this time to disengage notch 57 from stud 58. This prevents the upper crossfooter from being selected for this cycle.

7. Automatic selection of crossfooters in general

When it is desired to select the crossfooters automatically, the lever 19 is moved to its No. 1 position and left there during all automatic operations.

Automatic selection of the crossfooter is under the control of lugs contained in magazines 5 secured on the carriage control plate 4. The general manner in which these lugs operate upon various mechanisms for controlling machine functions, with one exception, is completely treated in the aforementioned application Serial No. 581,800 and will, therefore, not be given here. From Figure 15 it will be observed that as the carriage advances into its various columnar positions, the control lugs, such as 78 and 79, depress corresponding levers, such as 80, which in turn depress corresponding rods, such as 81 (Figure 13). The exception mentioned is the automatic crossfooter selection control and occupies what is known as the No. 18 or rearmost carriage control position. The outer end 82 (Figure 15) of this lever 80 (see also Figure 3) overlies the projection 83 on the upper end of a vertically disposed slide 84. This slide is mounted on studs 85 on the machine frame. The lower end of slide 84 carries a stud 86 which lies in the bifurcated end of a rearward extension formed on crossfooter selection blank 30. Spring 32 normally holds slide 84 in its elevated position. When the control lugs depress lever 80, slide 84 is moved downward, rocking blank 30 clockwise of its pivot 31 against the tension of spring 32. The degree of movement imparted to slide 84 determines which crossfooters shall be selected.

8. Automatic selection of upper crossfooter

When it is desired to automatically select the upper crossfooter in a certain columnar position, the No. 18 (crossfooter selecting) position of the magazine 5 is not provided with a lug. When the carriage tabulates to this columnar position and the machine operates, notch 33 of blank 30 lies in the path of stud 35, as shown in Figure 3. The movement of the remaining crossfooter selecting parts is identically the same as described in the previous section entitled "Manual selection of the upper crossfooter" and hence will not be repeated here. Suffice it to say that bail 47 is retained in the position shown in Figure 3 wherein the upper crossfooter is selected.

9. Automatic selection of upper and lower crossfooters jointly

When it is desired to automatically select the crossfooters for joint operation, a short lug 78 (Figure 15) is placed in the No. 18 (crossfooter selecting) position of the magazine 5 for the columnar position in which such joint selection is desired. When the carriage tabulates to the position of this magazine, selector 80 is partially depressed and slide 84 moved downwardly a sufficient distance to rock selection blank 30 to a position where notch 34 lies in the path of stud 35, as shown in Figure 4. As above described, movement of blank 30 to this position results in the selection of both crossfooters upon operation of the machine.

10. Automatic selection of lower crossfooter

The lower crossfooter is automatically selected by placing a full length lug 79 (Figure 15) in the No. 18 position of the appropriate magazine. When the carriage tabulates to this magazine, lug 79 depresses the slide 84 its full distance of travel, which in turn moves blank 30 clockwise, its full amount, about pivot 31, as shown in Figure 5. Operation of the machine with these parts in this position results in operation of the remaining crossfooter selecting parts to select the lower crossfooter to the exclusion of the upper, in the manner above described.

11. Engagement of upper crossfooter

Having made the proper crossfooter selection, engagement thereof with the actuating racks is next effected. Referring now to Figures 10, 11 and 12, an actuating arm 88 is secured to actuating shaft 13 and has a pawl 89 pivoted on a stud 90 and tensioned clockwise about this stud from its position shown in Figures 10 and 11 by a spring 91 connected to one end of pawl 89 and to the actuating arm 88. A plate 92 is pivoted on a stationary stud 93 and has a stud 94 normally embraced by a hook 95 on pawl 89. A lever 96 is pivoted on rod 66 and is tensioned by a spring 98 for counter-clockwise movement about rod 66. A stud 99 lies within a slot in plate 92 to coordinate the movements of the plate and lever 96. The lever 96 also carries a stud 100 to cooperate with a shoulder 101 on pawl 89. A stud 102 is secured to plate 92 and is embraced by a notch 103 in the rear edge of a pendant 104. The upper end of pendant 104 is pivoted on a stud 105 secured to a rocker 106 pivoted on a stationary rod 107. Another pendant 108 is pivoted on a stud 109 on the rear end of rocker 106 and has a notch 110 embracing a stud 111 on the rear end of another rocker 112 pivoted on stationary rod 56ᵇ. A link 113 is pivoted on a stud 114 on the forward end of rocker 112 and on stud 76ᵃ on the forward end of rocker 59. As before mentioned, when the upper crossfooter is selected, cam lever 56ᵃ is also connected to rocker 59 through link 55. A lever 115 is pivoted at 116 in the machine frame and is connected at its lower end to a pitman 117 connected directly to the upper crossfooter shaft (see Figure 12). For a full disclosure of this mechanism reference may be had to the aforementioned application Serial No. 581,800.

When the machine is operated, the initial counter-clockwise movement (Figures 10 and 11) of actuating arm 88 rotates plate 92 counter-clockwise about its pivot 93. This movement of plate 92 raises pendant 104 and lowers pendant 108. The lowering of pendant 108 oscillates rocker 112, raising link 113 and oscillating rocker 59. The oscillation of rocker 59 lowers engaging link 55 and with it cam lever 56ᵃ. This first movement of these parts is sufficient to bring rockers 112 and 59 and lever 56ᵃ to their substantially horizontal positions. When the lever 56ᵃ is in this position a stud 118 on the upper end of lever 115 lies in the middle portion 119 of a cam slot provided in lever 56ᵃ. This movement of the parts causes lever 115 to oscillate sufficiently to move the upper crossfooter to a position equidistant from both sets of racks 15 and 16 (Figure 12). In this position the crossfooter is disengaged from both sets of racks and has its wheels held against rotary movement by an aligner 120. The details of this aligner mechanism are not shown as they are fully disclosed in the United States Patent No. 1,965,611, issued to Oscar J. Sundstrand.

The plate 92 and its connections to the crossfooter remain in this position during the remainder of the counter-clockwise movement of actuator arm 88. When rocker 59 is in its horizontal position, notch 123 is opposite rod 60, but since selection of the upper crossfooter restrains bail 47 from forward movement, spring 61 retains notch 57 in engagement with stud 58. At this time the parts are in a position wherein shoulder 101 of pawl 89 lies directly in front of stud 100.

The first portion of return clockwise movement of actuator arm 88 moves stud 100 counter-clockwise about rod 66. This oscillates plate 92 clockwise about pivot 93 and returns pendants 104 and 108, rockers 112 and 59, levers 56ᵃ and 115, and the crossfooter to their original positions as shown in Figure 10, wherein the crossfooter is in engagement with the adding racks 15. The movement of these parts to their original positions takes place during the first increment of return movement of actuator arm 88, thereby leaving the major portion of the return stroke for the crossfooter actuator racks to perform their function.

12. Engagement of upper and lower crossfooters for joint actuation

Having made the proper crossfooter selection, the upper crossfooter is engaged in exactly the same manner as explained in the foregoing, the spring 61 (Figure 10) holding notch 57 in engagement with the stud 58 during the operation. When rocker 59 is moved to its horizontal position, stud 76ᵃ is raised into alignment with notch 75, as above explained, whereupon strong spring 67 moves link 73 forward, engaging notch 75 with stud 76ᵃ. Subsequent counter-clockwise movement of rocker 59 lowers link 73 and thereby raises the rear end of cam lever 74ᵃ, engaging the lower crossfooter. It will be observed that cam levers 56ᵃ and 74ᵃ for the upper and lower crossfooters respectively are similar in every respect and are connected for simultaneous and identical movement when engaging link 73 embraces stud 76ᵃ, as shown in Figure 11. Since cam lever 74ᵃ is connected to the lower crossfooter through a pitman 121 and a lever 122 similar to the corresponding elements for the upper crossfooter, the lower crossfooter is engaged and disengaged simultaneously with the upper crossfooter during this operation.

13. Engagement of lower crossfooter alone

Having made the proper crossfooter selection, notch 57 of link 55 disengages, during the machine operation, from stud 58 against the tension of spring 61, as clearly shown in Figure 11 and described in the foregoing. Link 73, however, occupies the same position as described in the immediately preceding section, i. e., with notch 75 embracing stud 76ᵃ.

With notch 75 in link 73 engaged with stud 76ᵃ, and notch 57 in link 55 disengaged from stud 58, the clockwise movement of plate 92 at the beginning of the return stroke of actuating shaft 13 engages the lower crossfooter and leaves the upper crossfooter disengaged, as shown in Figure 11.

14. Actuation of the crossfooters

The actuation of the crossfooters following their engagement with the adding or subtracting racks has been fully described in the co-pending applications Serial Nos. 581,800 and 88,092 of Oscar J. Sundstrand hereinbefore mentioned. For an understanding of this operation reference may be had to these applications. It may be stated, however, that these racks 15 to 18 (Figure 17) are arranged for simultaneous vertical reciprocable movement during every machine cycle, and that when the upper crossfooter is engaged, their action is only upon the totalizer wheels 11. When both upper and lower crossfooters are engaged, their action is upon totalizer wheels 11 and 12 jointly. When the lower crossfooter is engaged exclusive of the upper crossfooter, their action is solely upon the totalizer wheels 12.

15. Subtraction in the crossfooters

Referring to Figure 13, a crossfooter subtract key 125 has the lower end of its stem resting on a bail 126 pivoted on a rod 127. A slide 128 is mounted for movement forwardly and rearwardly of the machine and has a shoulder on its front end lying in front of bail 126. A bail 129 is pivoted on a rod 130 and has a downwardly extending arm 131 connected by a spring 132 to an upstanding arm 133 on slide 128. The tension of spring 132 normally holds a shoulder 134 on arm 131 in contact with a stud 135 on arm 133. A spring 136 normally holds slide 128 and arm 131 in their rearward positions shown in Figure 13. The other arm 137 of bail 129 likewise extends downwardly and has a fork 138 at its lower end embracing a stud 139 on pendant 108.

When it is desired to subtract rather than add in the crossfooters, the crossfooter subtract key 125 is depressed, moving slide 128 forward and tensioning springs 132 and 136. Upon operation of the machine, counter-clockwise movement of plate 92 at the beginning of the operation lowers pendant 108 and moves rocker 112 to its horizontal position, as explained in the foregoing. As soon as stud 114 arrives opposite a notch 140 in the forward edge of pendant 108, the tension of spring 132 pulls arms 131 and 137 and pendant 108 forward, engaging notch 140 with stud 114 and disengaging notch 110 from stud 111. Now upon the clockwise movement of plate 92 at the beginning of the return stroke of actuating shaft 13, instead of link 113 (Figure 11) being lowered to raise the cam levers 56a and 74a, it will be raised to lower the cam levers. Now instead of levers 115 and 122 being rotated counter-clockwise about their respective pivots as in adding operations, they are rotated clockwise by the upper ends of the cam slots in levers 56a and 74a engaging the crossfooters with the forward sets of racks 16 and 18 (Figure 11) for subtraction. During the remainder of the return stroke of the actuating shaft 13 the crossfooters are actuated by these racks. The crossfooters remain in engagement with the subtracting racks at the end of the operation and until the beginning of the succeeding operation, at which time they are brought to their intermediate or disengaged positions by the intial counter-clockwise movement of plate 92.

In the above explanation it was assumed that both crossfooters were engaged for the subtracting operation. If, however, only one of them should be engaged, the parts would operate in the same manner as described except that the engaging link 55 or 73 (Figure 11) of the crossfooter unselected would not be operated to move the crossfooter into engagement with the subtracting racks after such engaging link was moved to its intermediate position. Figure 10 shows lower crossfooter engaging link 73 in such intermediate position and Figure 11 shows upper crossfooter engaging link 55 in such intermediate position.

For a more detailed understanding of the subtraction mechanism, reference may be had to application Serial No. 581,800.

16. Taking totals from crossfooters

When it is desired to take a total from either the upper or the lower crossfooter, it is necessary to put the machine through a blank cycle with the crossfooter selecting lever 19 (Figure 3) in either its forward or rearmost position. This blank cycle is for the dual purpose of restoring any tripped transfer elements and for engaging the selected crossfooter with its actuating racks. With lever 19 in its forward position, engaging link 55 (Figure 10) for the upper crossfooter is engaged with stud 58 during the operation to engage the upper crossfooter, and engaging link 73 for the lower crossfooter is disengaged from stud 76a to disengage the lower crossfooter. With the lever 19 in its rearmost position, engaging link 73 for the lower crossfooter is engaged with stud 76a during the operation to engage the lower crossfooter, and engaging link 55 for the upper crossfooter is disengaged from stud 58 to disengage the upper crossfooter.

To change the timing of the crossfooter engaging mechanism for total taking operations, a crossfooter total key 141 (Figure 13) is provided. The lower end of this key rests on a bail 142 pivoted on a rod 143. Bail 142 lies directly behind a projection on the forward end of a slide 144. The slide is mounted for forward and rearward movement in the machine and has an upwardly extending portion 145 with a rearwardly extending arm 146. A bail 148 pivoted on a rod 149 has a stud 150 on one of its arms 151. A strong spring 152 is connected to portion 145 of slide 144 and to stud 150 to normally hold arm 146 in contact with the stud. A weaker spring 153 is secured to the upper end of arm 151 and to the machine frame and normally holds the arm and slide 144 in their rear positions. A link 154 is pivoted on the upper end of the other arm (similar to arm 151 of bail 148) and to the lower end of pendant 104. When the crossfooter total key is depressed, slide 144 moves forward, and because of the tension of spring 152, pendant 104 is pushed forward, disengaging stud 102 from its notch 103 in the pendant. The movement is arrested by the forward edge of the pendant striking a stud 155 on plate 92. This arrests movement of stud 150 so that the continued depression of total key 141 to its fully depressed position moves arm 146 forwardly away from the stud, stretching spring 152. Upon operation of the machine, the initial counter-clockwise movement of plate 92 at the very beginning of the operation moves stud 155 opposite a notch 156 in the forward edge of pendant 104, at which time spring 152 moves the pendant an additional increment forward to engage the stud with the notch 156. During the remainder of the counter-clockwise movement of the actuating shaft 13 the total is taken from the crossfooter wheels in the manner described in the aforementioned application Serial No. 581,800. At the beginning of the return stroke of the actuating shaft, shoulder 101 of pawl 89 raises stud 100 and thereby rotates plate 92 clockwise, as previously explained in the foregoing, raising stud 155, and with it pendant 104. This disengages the selected crossfooter from the actuating racks, as required before the racks begin their return movement.

17. Taking sub-totals from the crossfooters

When it is desired to take a sub-total from either the upper or the lower crossfooter, the lever 19 is moved to either its forward or rearmost position to select that crossfooter from which it is desired to take the sub-total. The machine is then put through a blank cycle to restore any tripped transfer elements and to engage the selected crossfooter with its actuating racks. Referring to Figure 13, a crossfooter sub-total key 157 has its lower end resting on a bail 158 pivoted upon a rod 159. Bail 158 lies behind a projection on the forward end of a slide 160 mounted for forward and rearward movement in the machine. Slide 160 has an upstanding arm 161 (Figure 16) with a cam surface 162 contacting a stud 163 on the rear end of a bail lever 164 pivoted on a rod 165. The forward end of lever 164 carries a stud 166 lying in the same vertical plane as stud 100. By the above described connections, depression of the crossfooter subtotal key 157 lowers stud 166 into substantially the horizontal plane of stud 100 where it prevents shoulder 101 of pawl 89 from engaging stud 100.

Referring to Figure 9, two links 167 and 168 are loosely connected at their upper ends to the crossfooter total and sub-total keys respectively and at their lower ends to bails 142 and 158 respectively. A forwardly extending arm 169 is rigidly secured to link 167 and extends under a stud 170 on link 168. By these connections, depression of the crossfooter sub-total key depresses link 168 and also the crossfooter total key.

When these two keys are depressed, with the crossfooter selecting lever 19 in its forward position shown in Figure 3, and the machine then operated, the upper crossfooter remains engaged with the actuating racks during their initial movement, the same as described above for the total taking operation. However, when the actuating shaft begins its return stroke, stud 166 (Figure 16) prevents pawl 89 from raising stud 100 and pendant 104 to disengage the crossfooter, allowing it to remain engaged while the actuating racks are returned to their initial position, as required. At the very end of the return stroke of the actuating shaft, hook 95 engages stud 94 and rotates plate 92 clockwise to its normal position shown in Figure 11.

When it is desired to take a sub-total from the lower crossfooter, the crossfooter selecting lever 19 is moved to its rear position shown in Figure 8 and the machine operated through a blank cycle to restore any tripped transfer elements and to engage the lower crossfooter for sub-total taking. During an operation with the lever 19 in this position, the lower crossfooter engaging link 73 (Figure 11) is connected with stud 76ᵃ to control the lower crossfooter during the sub-total taking operation, while the upper crossfooter engaging link 55 is disconnected from stud 58 and connected with rod 60 to keep the upper crossfooter idle during the operation. Now upon depression of the crossfooter sub-total key and operation of the machine, a sub-total will be taken from the lower crossfooter in the same manner as explained in connection with the upper crossfooter.

18. Locks to prevent depression of crossfooter total keys at improper times

A well known lock mechanism is provided to prevent depression of the crossfooter total keys until after a blank cycle is taken. This mechanism is fully shown and described in the previously mentioned Sundstrand application Serial No. 581,800, and, therefore, need not be described here.

Another lock is provided to prevent depression of the crossfooter total keys when the selecting lever 19 occupies its intermediate position, where it selects both the upper and lower crossfooters, since an erroneous total would be given if both crossfooters were engaged for the same total taking operation. This latter lock is also effective to lock these keys whenever the lever 19 is moved out of either of its other two positions after the preceding cycle was taken. With such a lock it is apparent that a total taking operation must be performed with the selecting lever 19 in a position to select only one crossfooter, and it must be the same crossfooter that was left engaged at the end of the preceding operation. Referring to Figure 9, a plate 171 is pivoted on a stud 172 and has a latch 173 pivoted thereto on a stud 174. A spring 175 is connected to the latch and to the lower end of a lever 176 pivoted on a stud 177 and having a flange 178 normally bearing against the forward edge of plate 171 (Figure 8). Lever 176 is connected at its upper end to a pitman 179 mounted at its rear end on a stationary stud 180 for forward and rearward sliding movement. The rear end of pitman 179 lies in the vertical plane of a pin 181 secured in arm 43 and lies at such distance from the pin that when the actuating shaft 13 is rotated counterclockwise, pin 181 moves pitman 179 a short distance forward.

By these connections, whenever selecting lever 19 is moved to or through its intermediate position, a stud 182 on the lower end thereof passes over a tooth 183 on the lower edge of plate 171 and raises the plate a short distance. Spring 175 thereupon pulls the lower end of lever 176 forward, engaging flange 178 with a notch 184 in the rear end of plate 171, holding the plate in its upper position as shown in Figure 9. This raising of plate 171 likewise raises latch 173, engaging a notch 185 with a hook 186 secured to bail 142 that lies under the crossfooter total key. Since hook 186 must be moved rearwardly (as well as downwardly) whenever the crossfooter total key or (because of arm 169) sub-total key is depressed, these keys are locked against depression and remain so locked until the machine is again operated to release flange 178 from notch 184 to allow spring 175 to return plate 171 to its lower position.

To prevent the operator from defeating this lock by first pressing one of the total keys and then moving lever 19, plate 171 is provided with an extended portion 187 on its upper edge. This portion lies directly beneath hook 186 when the hook is moved rearwardly and downwardly by depression of one of the total keys, making it impossible for stud 182 to move tooth 183 out of its path, and thus preventing movement of the selecting lever 19 out of its instant position.

19. Taking an overdraft total from the upper crossfooter

This mechanism in general is disclosed in the applications previously referred to, but since several changes in this structure are made, description of the necessary portion of this mechanism will be given.

When there is a negative total or overdraft in the crossfooter, and said tool or overdraft is to be printed, it is necessary that the crossfooter be engaged with the substracting racks instead of the adding racks at the conclusion of the blank or spacing stroke. This result can be effected by holding the subtraction key depressed during the spacing stroke. Inasmuch, however, as it is desired that this mechanism be fully automatic, means is provided for automatically maintaining the crossfooter in condition for a negative total whenever it contains such a total. This mechanism includes a slide 187 (Figure 17) guided for horizontal reciprocation forwardly and rearwardly of the machine, said slide being impelled forward by a spring 188. On the rear end of slide 187 is an inwardly projecting arm 189 (see also Figure 14) arranged to engage an upstanding arm 190 on the slide 128 operated by the subtraction key 125, for the purpose of pushing the slide 128 forward into effective position. After each operation of slide 187 it is restored to its normal rear position by a cam 191 secured to the actuating shaft 13, the cam engaging a roller 192 on the slide near the end of the return stroke of the actuating shaft. The slide 187 is prevented from operating to push slide 128 into effective position except when there is an overdraft in the crossfooter. An overdraft slide 193 (Figure 14), movable transversely of the machine, carries an upstanding post 194 lying normally in the path of a shoulder 195 on slide 187 to prevent said slide from moving forward under the influence of its spring 188. A spring 196, connected to slide 193 and to the machine frame, tends to move the latter to the left to remove post 194 from the path of shoulder 195.

When there is a positive balance in the crossfooter, slide 193 is prevented from moving to the left (Figure 14) under the influence of spring 196 to release slide 187, by a stop arm 197 (see also Figure 17) fixed to a bail 198 pivoted on a rod 199. The upper end of bail 198 is arranged to be moved by a link 200 whenever the crossfooter passes through zero in either direction. When passing from positive to negative, link 200 moves to the right (Figure 17) thereby lowering stop arm 197, and when passing from negative to positive, it raises stop arm 197 to the position shown in Figure 17. A lever 201 is pivoted on slide 193 at 202 (Figure 14) and is tensioned counter-clockwise by a spring 203 connected to the lever and to slide 193. A stud 204 on slide 193 restrains lever 201 in the position shown in Figure 14. The left end of lever 201 lies normally in the same horizontal plane as the end of stop arm 197. Thus, when there is a positive balance in the crossfooter, lever 201 and slide 193 are held by stop arm 197 in position to have post 194 prevent slide 187 from moving forward, and when there is a negative balance in the crossfooter, slide 193 is permitted to move to the left under the influence of spring 196 to allow slide 187 to pull slide 128 (Figure 13) forward to condition the crossfooter for subtraction. In operations where slide 193 is permitted to move to the left (Figure 14), it is restored to its right hand or normal position at the very end of the same operation by a lever 205 pivoted on a stud 206 to the machine frame and operated by an upturned lug 207 thereon lying in the path of rearward movement of the rear end of slide 187. As slide 187 returns to its rear position, it contacts lug 207 and swings lever 205 about pivot 206, causing the forward end of lever 205 to strike a stud 208 on slide 193 and move the slide to the position shown in Figure 14. Therefore, if, during this same operation, the crossfooter is returned from negative to positive, stop arm 197 will be allowed to rise from under lever 201 to prevent movement of slide 193 to the left during the next operation.

By the above described mechanism it is apparent that when the crossfooter contains a negative balance, post 194 (Figure 14) will be out of the path of forward movement of slide 187, allowing this slide to pull slide 128 forward to engage the crossfooter with its subtracting racks during the blank cycle preparatory to the taking of a total. With the crossfooter engaged with the subtraction racks, depression of the total key and operation of the machine in the customary manner will result in a proper negative total being taken.

A means is also provided to prevent slide 187 from moving forward during amount entering operations when there is a negative balance in the crossfooter. It is obvious that if the slide is not prevented from moving forward at this time, the amount entered will be subtracted rather than added. This means includes a slide 209 (Figure 18) extending transversely of the machine and having an upstanding finger 210. As fully described in application Serial No. 581,800, the setting up of a digit on the amount keyboard causes a slide 353 corresponding to the slide 209 to move a short distance to the right as viewed in Figure 18. This movement is sufficient to place finger 210 in front of the forward end of slide 187 (Figure 17), and thereby prevents forward movement thereof during the ensuing operation.

20. Taking an overdraft total from the lower crossfooter

To take an overdraft total from the lower crossfooter, it is necessary, as in the case of the upper crossfooter, to have the crossfooter engaged with its subtraction racks instead of its addition racks. Since the actual engaging of the lower crossfooter with the subtraction racks is controlled by a movement of the same slide 128 as was involved in engaging the upper crossfooter with its subtraction racks, it is only necessary to provide sufficient additional mechanism to cause the presence of a positive balance in the lower crossfooter to hold slide 193 (Figure 14) against movement to the left and to cause the presence of a negative balance to allow slide 193 to move to the left. This mechanism includes (Figure 17) a bail 212 similar to bail 198, to which is secured an arm 213 having a pivotal connection with the lower end of a pitman 214. The upper end of the pitman is slidably supported on a rod 215 and has a laterally turned stop arm 216 (see also Figure 14) lying in the same horizontal plane as stop arm 197. When the lower crossfooter passes from positive to negative, a link 217 (Figure 17) is moved to the right, and when it passes from negative to positive, the link is moved to the left in the same manner as above described in connection with link 200. This has the effect of lowering and raising stop arm 216 similarly to the movements of arm 197.

Referring to Figure 14, a projection 218 on the right end of lever 201 lies in the path of a downwardly extending projection 219 on crossfooter selection blank 30 (see also Figures 3, 4 and 5). By these connections, when lever 19 is moved from either its forward or intermediate positions to its rear position for selecting the lower crossfooter alone, projection 219 moves projection 218 forward, swinging the left end (Figure 14) of lever 201 rearwardly against the tension of spring 203 until it lies opposite stop arm 216. Now upon operation of the machine through the blank cycle, slide 193 is prevented from movement to the left if the balance in the lower crossfooter is positive, and is allowed to move to the left if the balance is negative. As in connection with the upper crossfooter, movement to the left allows slide 187 to move forward for engaging the crossfooter with the subtraction racks.

By this mechanism, depression of the total key and operation of the machine in the customary manner takes a proper positive or negative total from the lower crossfooter.

21. Automatic control of crossfooter subtract, total and sub-total operations The crossfooter subtract slide 128, sub-total slide 160 and total slide 144 are arranged for automatic control by the paper carriage in the manner described generally in section 7. Each of these slides has a corresponding depressible lever 80 (Figure 15) arranged to depress rods 81 (Figure 13) which lie thereunder. Rods 81 rest upon corresponding bell cranks 220 pivoted on a rod 221 secured in the machine frame. The lower ends of these bell cranks rest against the rear ends of slides 128, 160 and 144, which, as described in the foregoing, are connected to the keys 125, 157 and 141 respectively. Lugs, such as 79 (Figure 15), placed selectively in magazines 5 on the control plate 4, selectively depress rods 81 and shift their corresponding slides forward, as the paper carriage advances to the various columnar positions, the same as though their corresponding keys had been depressed manually.

22. *Signal printing for totals taken from the lower crossfooter*

A mechanism is provided to print a signal whenever a total is taken from the lower crossfooter to identify such totals as against totals taken from the upper crossfooter. This mechanism causes a signal consisting of two square dots (Figure 3) to be printed by a special type 222 operated by a printing hammer 223 for the right hand type bar 1 (see also Figure 1). The type 222 has a flange on its forward end at 224 extending transversely of the machine, and projecting into the vertical plane of type hammer 223. The flange, however, normally lies below the path of movement of the type hammer, as shown in Figure 3. Therefore, it is only necessary to oscillate type 222 sufficiently to raise the flange into the path of hammer 223 to cause the lower crossfooter designating signal to be printed.

The construction of the mounting for type 222 and the manner in which the type is slidably supported therein is identical with that fully disclosed in application Serial No. 88,092.

Suffice it to say here that this mounting is pivotally secured on a shaft 224ª secured in a bracket to the machine frame. A lever 225 is secured to shaft 224ª and is pivoted to a link 226. A bail 227 pivoted on a rod 228 has a horizontal arm 229 pivotally connected to the lower end of link 226, and a downwardly extending arm 230 carrying a pin 231, the outer end of which lies in front and in the path of a projection 232 on an arm 233 of crossfooter control slide 37. The distance between pin 231 and projection 232 is such that when slide 37 is in position to select either the upper crossfooter (Figure 3), or both crossfooters jointly (Figure 4), projection 232 has no influence on pin 231. However, when slide 37 advances to the position where the lower crossfooter is selected (Figure 5), projection 232 strikes pin 231, rocking bail 227 clockwise about its pivot 228, and through arm 229, link 226 and lever 225, rocks type 222 into alignment with hammer 223.

In this manner a two-dot symbol (Figure 3) can be printed during operations involving selection of the lower crossfooter. A spring 234 returns bail 230 and type 222 to their nomal position (Figure 3) at the end of the operation.

Although reference to the Sundstrand applications Serial Nos. 581,800 and 88,092 is given a number of times in the preceding description, it was not given in every instance where a more complete disclosure of the mechanism may be found. It is, therefore, to be understood that wherever the disclosure is inadequate for a complete understanding of the invention, such reference should be resorted to.

While the form of mechanism herein shown and described is admirably adapted to fulfill the objects primarily stated, it is to be understood that it is not intended to confine the invention to the one form of embodiment herein described, for it is susceptible of embodiment in various forms all coming within the scope of the claims which follow.

What is claimed is:

1. In a machine of the class described, two totalizers, actuators therefor, means to engage the totalizers with the actuators, a selecting mechanism movable to three positions to control the operation of the engaging means for both totalizers, the mechanism including a stepped lever movable to three positions and a slide having a part thereof cooperating with the steps on the lever to limit movement of the former during a machine operation and having connections to the engaging means for both totalizers, a traveling paper carriage, and means on the carriage to control movement of the stepped lever.

2. In a machine of the class described, two totalizers, actuators therefor, means to engage the totalizers with the actuators, a selecting mechanism movable to three positions to control the engaging means, the mechanism including a stepped lever movable to three positions and a slide having a part thereof cooperating with the steps on the lever to limit movement of the former during a machine operation, a key, a connection between the key and the stepped lever to enable movement of the key to move the lever to its different positions and connections between the slide and the engaging means to enable the latter to engage one totalizer when the slide is in one position, the other totalizer when the slide is in another position, and both totalizers when the slide is in the third position.

WALTER A. ANDERSON.